Patented Dec. 16, 1947

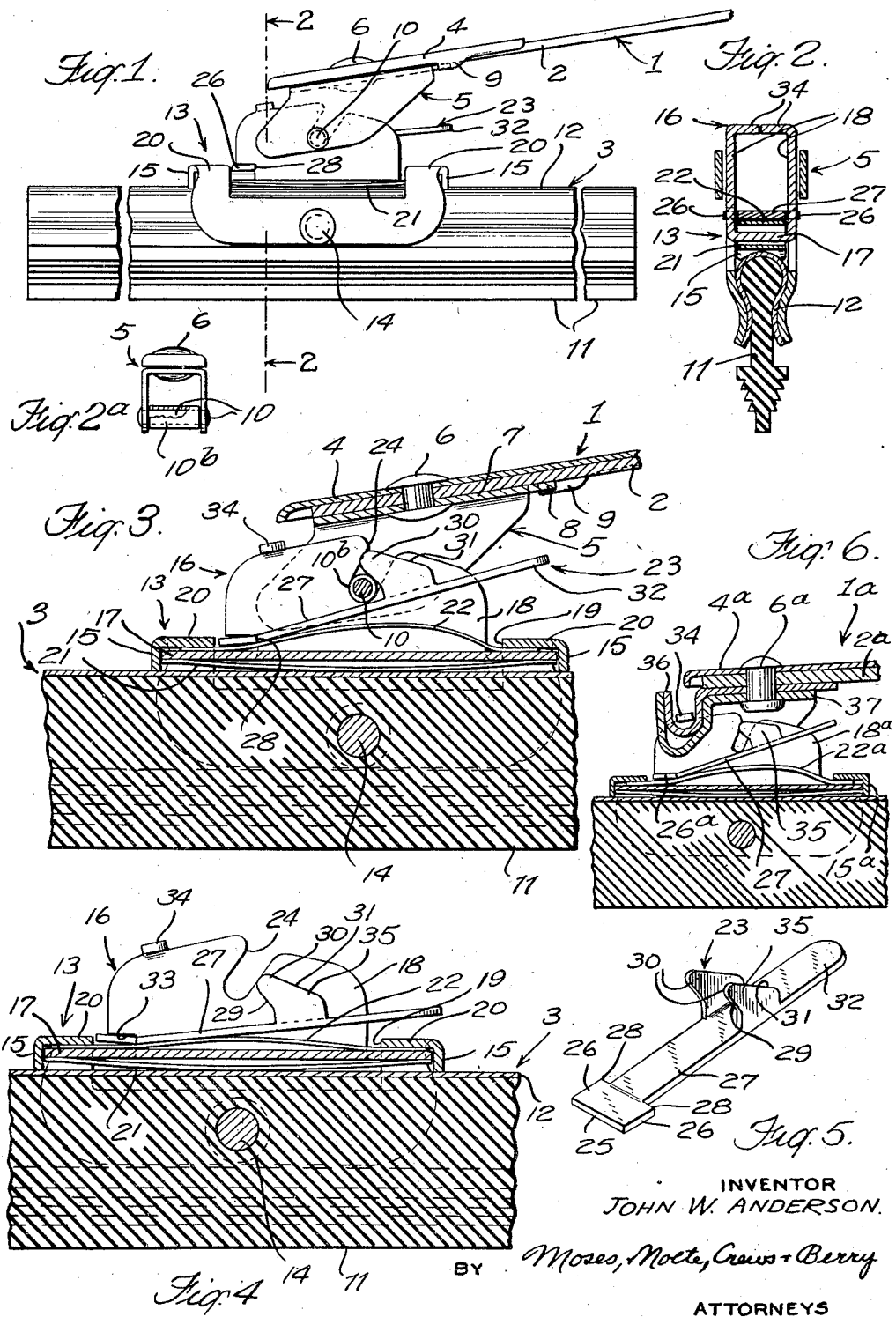

2,432,693

UNITED STATES PATENT OFFICE 2,432,693

WIPER BLADE CONNECTOR MECHANISM

John W. Anderson, Gary, Ind., assignor to Productive Inventions, Inc., a corporation of Indiana Application March 16, 1944, Serial No. 526,744

31 Claims. (Cl. 15—250)

This invention relates to mechanism for connecting a windshield wiper blade to the outer end of a windshield wiper arm, and is in the nature of an improvement upon the inventions disclosed in pending applications of Theodore J. Smulski, Serial No. 432,377, filed February 26, 1942, for Automatic blade clips, and Serial No. 523,445, filed February 22, 1944, for Windshield wiper blade connectors.

In each of said prior applications disclosure is made of a connector mechanism for connecting the arm and blade members of a windshield wiper, including an entering part or cross connector affixed to one of the members, and connector apparatus cooperative with the cross connecter, affixed to the other member.

The cooperative connector apparatus disclosed in each of said prior applications comprises a body member which is preferably provided with an opening or notched to receive the entering part or cross connector. A locking member is carried by the body member for movement transversely of the notch between a locking position in which it obstructs the notch entrance to oppose withdrawal of the cross connector through the entrance, and an unlocking position in which it substantially clears the notch entrance. Provision is made of spring means for urging the locking member toward locking position, handle means for moving the locking member to unlocking position, and detaining means for detaining or cocking the locking member in unlocking position against the restoring force of the spring.

The connector mechanisms just referred to are very satisfactory and practical as compared with other connector mechanisms which have preceded them. Either of them affords a means for automatically and instantaneously affecting a locked connection between the blade and wiper arm members in response to the mere insertion of the entering part or cross connector in the opening or notch and the application and transmission through the cross connector of a light tripping force for causing the locking member to be snapped over from unlocking position to locking position.

Each of these prior constructions, however, requires that the locking member, when carried by the blade, be operated to and cocked in an unlocking position as a preliminary to the attachment of the blade to a wiper arm. This takes time which can ill be spared in a busy and crowded service station. If the locking member should thereafter be accidentally tripped, it would have to be cocked again, because the locking apparatus cannot receive the part or cross connector of the wiper arm so long as the locking member is permitted to remain in locking position.

It is an important object of the present invention to provide connector mechanism through which the arm and blade members of a windshield wiper may be instantaneously connected to one another to effect a strong and dependable connection, but in which the cocking of the locking member in an unlocking position may be and is discarded, and the attendant delay is avoided.

To this end, it is a feature of the invention that provision is made as heretofore of an entering part or cross connector and of cooperative connector apparatus which comprises a body member or clip having a notch, opening, or recess for receiving the part or cross connector and a locking member which (1) Normally occupies a locking position in which it obstructs the entrance of the notch or recess to oppose accidental withdrawal of an entering part or cross connector from the opening or notch;

(2) Admits readily of manual operation, through a handle which is provided, to an unlocking position in which it substantially clears the notch entrance to permit the ready removal of the entering part or cross connector from the opening or notch when a wiper blade is to be discarded;

(3) Admits readily of operation from the locking position to the unlocking position in which it unlocks the opening or notch entrance in response to force applied to it by the entering part or cross connector as an incident of insertion of the part or cross connector in the recess or notch; and (4) Snaps back into locking position to maintain a secure and dependable connection between the arm and blade members as soon as the cross connector has been so inserted.

By virtue of the described construction, not only is an improved mode of operation secured, but a simpler and more economical structure is provided than has been available heretofore.

It is a further important object of the present invention to provide a simple and economical connector apparatus which may be permanently secured to a wiper blade to adapt the latter for quickly detachable connection to wiper arm connectors of various well known constructions.

Other objects and advantages will hereinafter appear.

In the drawing forming part of this specification:

Fig. 1 is a fragmentary view in side elevation, broken away intermediate its ends for compactness of illustration, showing wiper arm and wiper blade members connected to one another through the novel connector mechanism of this application;

Fig. 2 is a sectional view on the line 2—2 of Fig. 1 looking in the direction of the arrows, Fig. 2 being, however, on a considerably larger scale than Fig. 1;

Fig. 2a is a transverse sectional view of the arm-carried connector mechanism;

Fig. 3 is a fragmentary longitudinal sectional view on the same scale as Fig. 2, showing the parts in the positions occupied by them when the wiper blade is attached to the wiper arm;

Fig. 4 is a view similar to Fig. 3 but showing only the wiper blade and the parts permanently associated with the blade, the locking member being here illustrated as displaced to an unlocking position;

Fig. 5 is a detail perspective view showing the locking member employed in the structure of Figs. 1 to 4; and Fig. 6 is a view similar to Fig. 3 but on a smaller scale than Fig. 3, showing the novel blade-carried connector apparatus cooperatively attached to a wiper arm equipped with a connector of the hook type.

The illustrative apparatus comprises a windshield wiper arm 1, of which only the outermost end portion 2 is illustrated, and a windshield wiper blade 3 which may be connected to the arm through the connector mechanism shown. The outermost arm section 2 has affixed to it a flanged plate 4 which bears against the forward face of the arm section 2 and whose flanges bear against side faces of the arm section 2 to prevent rotation of the plate 4 relative to the arm section 2. A channeled hanger 5 is secured to the arm section 2 and to the plate 4 by a rivet 6 which is passed through the base portion 7 of the channeled member 5, through the arm section 2, and through the plate 4, being upset to bind these parts firmly together.

The channeled member 5 is held in firm frictional engagement with the rear face of the wiper arm section 2 so that angular movement of the channeled member about the axis of the rivet is resisted by firm frictional pressure, but is not absolutely precluded. Thus, the channeled member 5 can be adjusted angularly and held frictionally in any selected position of angular adjustment in accordance with the invention disclosed and claimed in United States Letters Patent to Anderson #2,290,140.

The base 7 of the channeled member 5 is provided with an inwardly protruding tail portion 8 which extends between ears 9 formed on the opposite side flanges of the plate 4. The tail 8 cooperates with the ears 9 to limit the angular adjustment of the channeled member 5. A cross connector or entering part or portion 10 preferably in the form of a cylindrical pin or rivet is permanently secured to the opposite side walls of the channeled member 5, as by having its ends upset, and constitutes one of the connector elements through which the wiper blade 3 is attached to the wiper arm 1. A bearing sleeve 10b surrounds the entering part or cross pin 10, being rotatively mounted upon the pin and being long enough substantially to reach from one to the other of the side walls of the channeled member 5.

The wiper blade consists of a formed wiping element 11 of soft yieldable material such as rubber, and a rigid, metallic frame 12 in which the wiping element is secured.

A U-shaped clip 13 embraces the blade frame 12, interfitting with the recessed side walls thereof, and being permanently attached to the blade by means of a rivet 14 which is passed through the opposite walls of the clip 13, the opposite walls of the blade frame 12, and the body of the wiping element 11, and which has its ends upset. Ears 15 are provided at the inner and outer ends of the clip 13, these ears being folded rearwardly to bear against the forward face of the blade frame 12.

The connection means may be constructed as desired but preferably includes a recessed connector member 16 comprising a base portion 17 and parallel side walls 18; its base portion 17 is caught in the spaces between the forward portion of the clip 13 and the forward wall of the blade frame 12 and provides means by which the connection means is supported for movement relative to the clip 13. The portion 17 in effect provides pivot means. The base 17 is long enough to extend substantially from end to end of the clip 13 so that it is limited against endwise movement by engagement with the end ears 15 of the clip 13. The side walls 18 extend forward through a substantial opening 19 which is formed in the base and adjacent side wall portions of the clip 13. The base 17 of the member 16 is urged toward engagement with the front wall portions 20 of the clip 13 by resilient means preferably in the form of a bowed spring 21 which is lodged between the base 17 and the forward face of the blade frame 12, and which is just long enough to be received between the end ears 15 of the clip 13.

Resilient means preferably in the form of a similar bowed spring 22 has its ends received between the ends of the supporting means 17 and the end portions 20 of the clip 13 and cooperates with the supporting means or base portion 17. The intermediate portion of the spring 22 extends between the side walls 18 of the member 16 and is bowed in a forward direction so that it protrudes through the opening 19 of the clip 13. The resilient portions 21 and 22 which comprise the resilient means may operate independently of each other if found desirable or jointly or in combination with each other. It is of course to be understood in this respect that the connection between the connection means and entering part provided on the operating arm may be established without in any way materially affecting the connection between the connection means and the mounting or clip 13.

The spring 22 bears against a locking lever 23 through which the cross connector 10 is detained in slots 24 formed in the side walls 18 of the member 16. Insofar as the present invention is concerned, the slots 24 may constitute an opening or a recess for the reception of the connector 10 to be held therein.

Yieldable holding means including the locking lever 23 is shown in detail in Fig. 5. It comprises an end portion 25 whose side margins 26 extend outward beyond the lateral bounds of a body portion 27 of the lever and form shoulders 28 adjacent said body portion 27. Intermediate the ends of the body portion 27 of the lever, side ears 35 are provided, these ears being folded forwardly into parallel relation at opposite sides of the lever. The ears are shaped alike and are in registry with one another. Each ear comprises a forwardly extending relatively straight edge portion 29 which constitutes a locking element for engaging the cross connector 10 and retaining it in the recesses 24. The edge 29 at its forward end merges into a smoothly rounded surface formation 30 which connects with a forward edge 31 of the ear, the surfaces 30 and 31 extending transversely of the recess 24, but more nearly in a radial direction than the surface 29. The right hand end of the lever 23 terminates in a handle portion 32 which projects into accessible position clear of the side members 18 of the channel hanger 16. It should be noticed that the surfaces 29 of the ears 35 extend obliquely across the recess 24 and substantially at right angles to radii joining them with the fulcrum of the lever 23. Attention is further directed to the fact that the edges 29 of the portions or ears 35 are provided with recesses or at least form recesses with the body portion 27 of the yieldable holding means.

The body portion 27 of the lever 23 is desirably of a width sufficient to extend substantially from one wall 18 to the other wall 18 of the member 16. The ears 26 extend farther outward through slots 33 formed in the walls 18 in alignment or substantial alignment with an adjacent portion 20 of the clip 13. The shoulders 28 formed on the ears bear against the bases of slots or apertures 33 and provide a fulcrum for the lever 23. Escape of the ears 26 from the slots 33 is blocked by the adjacent portion 20 of the clip 13.

The normal condition of the parts is that illustrated in Figs. 1 and 3, in which a blade 3 is shown connected to the wiper arm 1. The side walls of the channel member 5 embrace the member 16, and the cross connector 10 carried by the member 5 is inserted in the notches or recesses 24 in engagement with the bottoms thereof.

The portion 29 of the lever 23 extends in a locking position in which it blocks withdrawal of the cross connector 10 through the entrance of the notched portion 24 of the member 16. It will be observed that the portion 29 of the lever 23 extends almost at right-angles to a radius drawn from a shoulder 28 to the surface of lever section 29 which is engaged by the cross connector 10. With the parts thus engaged as shown in Fig. 3, any force tending to withdraw the cross connector from the notches 24 will be completely ineffectual to rock the portion 29 of the lever 23 out of obstructing relation to the cross connector 10.

A true pivotal connection is formed between the wiper arm and wiper blade. The sleeve 10b is held in fixed relation to the member 16 by the notches 24 and the locking lever 23. The pin of the cross connector 10 is free to turn within, and relative to, the sleeve 10b. Rocking of the blade relative to the arm can, therefore, occur in normal operation without objectionable frictional resistance and without objectionable wear of parts. When, however, it is desired to remove the wiper blade from the wiper arm, the handle portion 32 of the lever 23 is simply moved toward the wiper blade, very little force being required for executing this movement, whereupon the lever is displaced to the position illustrated in Fig. 4. With the lever thus moved to a non obstructing position, the wiper blade can be very easily removed from the wiper arm, there being nothing to detain the cross connector 10 in the notches 24.

When it is desired to attach a new wiper blade to the wiper arm, the lever will initially occupy the relation to the slot 24 and to the other parts of the wiper blade-carried connector apparatus illustrated in Fig. 3. It is not necessary to operate the lever by means of the handle 32 in order to permit the cross connector 10 to be inserted in the notches 24. On the contrary, if the wiper blade 12 is moved in exactly the manner which would be required, if the locking member 23 were omitted, for lodging the cross connector 10 in the notches 24 as shown in Fig. 3, the presence of the lever 23 will be found to present no appreciable obstruction to such association of the parts. In other words, engagement of the cross connector 10 with the portions 31 and 30 of the lever is effective to rock the lever in a clockwise direction sufficiently to clear the cross connector and to permit it to be lodged in the notches 24. As soon as the cross connector has passed the hump of the locking lever 23, the locking lever springs back to the position illustrated in Fig. 3, so that the connection of the wiper blade to the wiper arm is complete. The arrangement provides a particularly efficient yieldable holding means.

The side walls 18 of the member 16 are formed with inturned ears 34 which abut one another. These ears serve to reinforce and space the side walls 18 in the structure illustrated and described. They also may be utilized as a cross connector, however, for attaching the blade-carried connector apparatus to various wiper arm-carried connectors of the hook type, as shown, for example, in Patent No. 2,290,140. The parts of the member 16 and the parts carried by said member can be so proportioned and designed that the hooked connector when interfitted with the ears 34 will cooperate perfectly with the member 16.

Such an arrangement is illustrated in Fig. 6. In this figure the blade and blade-carried apparatus are all exactly the same as those illustrated in Figures 1 to 5 inclusive. The wiper arm is generally the same but the connector mechanism is of the type disclosed in Patent #2,290,140. In this form of mechanism the wiper arm 1a includes an outer section 2a on which a flange plate 4a is fitted. The plate 4a as well as a hook 36 and a channel member 37 are secured to the arm section 2a by means of a rivet 6a. The flanged plate 4a is held positively against rotation through its interfitting relation with the arm section 2a, and the parts 36 and 37 are strongly held by friction, but are free to be set in different positions of angular adjustment. The frictional clamping of the hook 36 against the arm section 2a by the rivet 6a causes the members 36 and 37 to remain in any angular position to which they may be adjusted. The cross connector formed by the inturned fingers 34 is located in the hooked portion of the member 36. The construction, arrangement and operation of the parts is the same in all respects as that described and explained with reference to the corresponding parts in Patent No. 2,290,140.

It will be seen that the blade-carried connector apparatus here illustrated is both extremely economical to manufacture, extremely practical in its mode of operation when used in association with a wiper arm connector of the kind herein illustrated and described, and is capable of cooperating with wiper arm connectors of various constructions.

I have described what I believe to be the best embodiment of my invention. I do not wish, however, to be confined to the embodiment shown, but what I desire to cover by Letters Patent is set forth in the appended claims.

I claim:

1. Connection means for connecting a windshield wiper blade unit to an operating arm unit comprising a housing adapted to be attached to one of said units, a channel part pivotally connected to said housing, an opening in said channel for receiving a connecting part to be held therein, and an elongated latch member having one end caught between said channel part and a portion of said housing, said latch having a portion movable between the walls of the channel and having a part for locking the connecting part in said opening.

2. Connection means for attaching a windshield wiper blade holder to an operating arm comprising a member secured to and forming with the holder a housing, said member being provided with a bottom portion spaced from the holder and side portions engaging the sides of the holder, an elongated opening provided in said bottom portion, a channel having a base wall and side walls, said base wall having continuations projecting into the space between the bottom portion of the member and the holder for securing the channel in position with its side walls projecting outwardly through the elongated opening, a notch provided in said channel for receiving a male part, resilient means disposed between said base wall and said holder for resiliently supporting said channel, a latch having one end caught between a portion of the channel and the member for holding the latch in place and a portion movable between said side walls, projection means extending laterally from said movable portion for holding the male part in said notch, a handle provided at the other end of said latch extending beyond the confines of the channel for operating the latch, and a spring disposed between said latch and the base wall of said channel providing a resilient backing for said latch.

3. Connector means for connecting a windshield wiper blade unit to an actuating arm unit, said connector means being carried by one of said units and constructed for the reception of an entering part provided on the other unit, yieldable holding means associated with said connector means including portions provided with recesses for receiving said entering part when it is inserted into said connector means whereby to assist in holding the connector means connected to said entering part, and tubular means carried by said entering part providing a bearing therefor.

4. Means for connecting a windshield wiper blade unit to an arm unit comprising, mounting means associated with said blade unit, elongated housing means, said mounting means and said housing means being constructed and arranged whereby one means receives the other means to provide a connection therebetween, said housing means including a pair of spaced walls, pair of openings provided in said housing means, yieldable holding means having at least one extremity disposed between at least a portion of said housing means and a portion of said mounting means and arranged in an interlocking relationship with said walls to assist in predetermining the position of a portion thereof between said walls in an operative relation to said openings in a manner whereby an entering part provided on the arm unit may be held in said openings so that said housing means may pivot with respect to said entering part.

5. Connector means for connecting a windshield wiper blade unit to an actuating arm unit, said connector means being carried by the blade unit and including a supporting part connected to said blade unit and a pair of spaced apart substantially parallel walls, elongated resilient means consisting of a bowed strip of material extending longitudinally between said walls, abutment means fixed on said connector means, said resilient means being secured in said connector means and having its opposite extremities located adjacent the extremities of said connector means and engaging said supporting part and having a portion intermediate its extremities operatively related to said abutment means in a manner whereby to assist in holding an entering part on the actuating arm unit relative to said abutment means without engaging the blade unit so that the connector means may move relative to such arm unit.

6. Connector means for connecting a windshield wiper blade unit to an actuating arm unit, a support mounted on said blade unit, said connector means being carried by said support for rockable movement substantially about the longitudinal axis of said support, said connector means including a housing having a pair of spaced apart side walls, yieldable holding means arranged between said walls and having extremities disposed adjacent the ends of said connector means, and an opening provided in said connector means, said yieldable holding means and said opening being constructed and arranged whereby an entering part on the actuating arm unit may be engaged by said yieldable holding means and held in said opening to prevent accidental displacement of such part from the connector means.

7. Connector means for connecting a windshield wiper blade unit to an actuating arm unit, an elongated support mounted on said blade unit, said connector means being carried by said support for rockable movement substantially about the longitudinal axis of said support, said connector means including a housing having a pair of spaced apart side walls, rounded abutment means provided on said housing, and elongated yieldable means facing said abutment means arranged between said walls and engaging said support, said yieldable means and said abutment means being constructed and arranged whereby an entering part on the actuating arm unit may be disposed therebetween in a manner whereby to permit rockable movement between said housing and such a part.

8. Connector means for connecting a windshield wiper blade unit to an actuating arm unit, a support mounted on one of said units, said connector means being carried by said support for rockable movement about its longitudinal axis, said connector means including an elongated housing, an opening provided in said housing, and elongated yieldable means arranged substantially in said housing and having extremities disposed adjacent the ends of said housing to position an intermediate portion of said means relative to said opening whereby such intermediate portion may engage and assist in holding an entering part on the other unit in said opening.

9. A connector for connecting a windshield wiper blade unit to an arm unit, a mounting carried by one of said units, resilient means in the form of a strip associated with said mounting, means on said connector engaging said resilient means for resiliently supporting said connector, said connector being provided with abutment means, and holding means movable with respect to the mounting operatively related to said resilient means and in coacting relationship with said abutment means for holding a part on the other unit relative to said abutment means.

10. Means for connecting a windshield wiper blade unit to an actuating arm unit comprising a connector mounted on one of said units, said connector being provided with abutment means, resilient means associated with said one unit providing a resilient support for said connector to permit said connector to move relative to said unit and latch means operatively related to said resilient means and arranged in coacting relationship with said abutment means whereby a part on the other unit may be held between said abutment means and said latch means.

11. Connector means for connecting a windshield wiper blade unit to an arm unit, said connector means being carried by one of said units and being constructed and arranged to engage a connecting part on the other unit, bearing means provided on said connector means, said bearing means being provided with a plurality of surfaces, resilient means associated with said blade unit and having portions disposed on opposite sides of said bearing means and engaging said surfaces for resiliency and pivotally supporting said connector means, and latch means operatively related to said resilient means for holding such connecting part in association with said connector means.

12. Connector means for connecting a windshield wiper blade unit to an arm unit, supporting means carried by one of said units providing a pivotal support for said connector means, and yieldable means disposed substantially within the confines of said connector means and operatively associated with said supporting means, said connector means being provided with an opening, and said yieldable means being provided with a portion structurally related to said opening whereby an entering part on the other unit may be engaged and held in said opening by the said portion of said yieldable means.

13. An elongated connector for connecting a windshield wiper blade unit to an actuating arm unit, said connector being mounted on one of said units and provided with abutment means, and yieldable means providing a yieldable support for said connector on said one unit, said yieldable means including a portion extending lengthwise within the connector and operatively related to said abutment means in a manner whereby such portion may engage and assist in holding a detachable connecting part on the other unit relative to said abutment means.

14. A connector for connecting a windshield wiper blade unit to an actuating arm unit, said connector being carried by one of said units, elongated resilient means associated with said one unit and providing a resilient mounting for said connector, and an elongated latch associated with said connector and operatively related to said resilient means for holding a detachable part on the other unit connected to said connector.

15. A connector for connecting a windshield wiper blade unit to an actuating arm unit, said connector being carried by one of said units, resilient means associated with said one unit and providing a resilient mounting for said connector, and a latch associated with said connector and engaging said resilient means for receiving and holding a detachable part on the other unit connected to said connector.

16. Connector means for a windshield wiper blade constructed and arranged to engage a connecting part on an arm, a mounting on said blade, means providing a rockable connection between said connector means and said mounting, and resilient means comprised of a pair of separate resilient members arranged substantially lengthwise with respect to the axis of said rockable connection, one of said resilient members being actable to assist in holding the connecting part in association with the connector means when brought into engagement therewith, and the other member being constructed and arranged to cushion the rocking movement of said connector means with respect to said mounting.

17. Elongated connector means constructed and arranged to engage a connecting part, a mounting, means providing a connection between said connector means and said mounting, and resilient means having portions arranged substantially lengthwise with respect to said connector means, one of said portions being actable to assist in holding the connecting part in association with the connector when brought into engagement therewith, and another portion being constructed and arranged to provide a resilient abutment for said connector means.

18. Connector means adapted to be attached to a member and constructed for the reception of an entering part, yieldable holding means associated with said connector means including portions provided with recesses for receiving said entering part when it is inserted into said connector means whereby to assist in holding the connector means connected to said entering part, and tubular means cooperable with said entering part providing a bearing therefor.

19. Connector means including a pair of spaced apart substantially parallel walls, mounting means for said connector means, elongated resilient means carried by and extending longitudinally in said connector means, abutment means on said connector means, said resilient means having its opposite extremities secured against excessive movement and an intermediate yieldable portion connected to said extremities operatively related to said abutment means in a manner whereby to assist in holding a part insertable into said connector means relative to said abutment means without engaging said mounting means, and means for supporting said connector means with respect to a support for lateral movement.

20. Apparatus adapted to be carried by a substantially rigid support, said apparatus including mounting means adapted for association with said support, housing means, said mounting means and said housing means being constructed and arranged whereby one means receives the other means to provide a connection therebetween, said housing means including a pair of spaced walls, abutment means on said housing means, yieldable holding means having at least one extremity disposed between at least a portion of said housing means and a portion of said mounting means and arranged in an interlocking relationship with at least one of said walls to assist in predetermining the position of a portion thereof between said walls in an operative relation to said abutment means in a manner whereby an entering part may be held substantially in pivotal relation with respect to said abutment means.

21. Connector means including a supporting part adapted to be connected to a substantially rigid mounting and having a pair of spaced apart substantially parallel walls, elongated resilient means extending longitudinally between said walls, abutment means fixed on said connector means, said resilient means being secured in said connector means and having its opposite extremities located adjacent the extremities of said connector means, said resilient means engaging said supporting part and having intermediate its extremities a portion operatively related to said abutment means in a manner whereby to assist in holding an entering part relative to said abutment means without engaging the mounting.

22. Connector means carried by a support for rockable movement substantially about the longitudinal axis of said support, said connector means including a housing having a pair of spaced apart side walls, yieldable holding means arranged between said walls with its extremities disposed adjacent the ends of said connector means, and abutment means provided on said connector means, said yieldable holding means and said abutment means being constructed and arranged whereby an entering part may be engaged by said yieldable holding means and said abutment means when inserted therebetween to prevent accidental displacement of such part from the connector means.

23. Connector means carried by a support for rockable movement substantially about the longitudinal axis of said support, said connector means including a housing having a pair of spaced apart side walls, abutment means provided on said housing, and elongated yieldable means facing said abutment means said yieldable means being arranged between said walls and engaging said support, said yieldable means and said abutment means being constructed and arranged whereby an entering part may be disposed therebetween in a manner whereby to permit relative movement between said housing and such a part.

24. Connector means carried by a support for rockable movement about its longitudinal axis, said connector means including an elongated housing, abutment means provided on said housing, and elongated yieldable means arranged substantially in said housing with its extremities disposed adjacent the ends of said housing to position an intermediate portion of said means relative to said abutment means whereby such intermediate portion may engage and assist in holding an entering part operatively related to said abutment means.

25. A connector, a mounting, resilient means associated with said mounting, means on said connector cooperating with said resilient means for resiliently supporting said connector, said connector being provided with abutment means, and holding means movable with respect to the mounting and operatively related to said resilient means in coacting relationship with said abutment means for holding a part relative to said abutment means.

26. A connector provided with abutment means, resilient means providing a resilient support for said connector, and latch means operatively related to said resilient means and arranged in coacting relationship with said abutment means whereby a part may be held between said abutment means and said latch means.

27. Connector means constructed and arranged to engage a connecting part, bearing means provided on said connector means, said bearing means being provided with a plurality of surfaces, resilient means having portions disposed on opposite sides of said bearing means and coacting with the said surfaces for resiliently and pivotally supporting said connector means, and latch means operatively related to said resilient means for holding a part in association with said connector means.

28. Connector means, supporting means providing a pivotal support for said connector means, yieldable means disposed substantially within the confines of said connector means and operatively associated with said supporting means, said connector means being provided with a wall having an opening therein, said yieldable means being provided with a portion structurally related to said opening whereby an entering part engaged by said yieldable means may be held in said opening by the said portion of said yieldable means.

29. A connector provided with abutment means, and yieldable means providing a yieldable support for said connector, said yieldable means including a portion operatively related to said abutment means in a manner whereby such portion may engage and assist in holding a detachable connecting part relative to said abutment means.

30. A connector carried by a support, resilient means associated with said support and providing a resilient mounting for said connector, and a latch associated with said connector and operatively related to said resilient means for holding a detachable part connected to said connector.

31. A connector carried by a support, resilient means associated with said support and providing a resilient mounting for said connector, and a latch associated with said connector and operatively related to said resilient means for pivotally receiving and holding a detachable part connected to said connector.

JOHN W. ANDERSON.

REFERENCES CITED

The following references are of record in the file of this patent:

UNITED STATES PATENTS

| Number | Name | Date |
| --- | --- | --- |
| Re. 8,925 | Potts | Oct. 7, 1879 |
| 690,144 | Grubbs | Dec. 31, 1901 |
| 1,110,368 | Young | Sept. 15, 1914 |
| 2,156,506 | Marcolivio | May 2, 1939 |
| 2,172,928 | Anderson | Sept. 12, 1939 |
| 2,240,369 | Horton | Apr. 29, 1941 |
| 2,312,781 | Taylor | Mar. 2, 1943 |

Certificate of Correction

Patent No. 2,432,693.                                                                 December 16, 1947.

JOHN W. ANDERSON

It is hereby certified that errors appear in the printed specification of the above numbered patent requiring correction as follows: Column 5, lines 63 through 72 should be a separate paragraph; same column, line 69, for "non obstructing" read *non-obstructing*; column 7, line 54, claim 4, after the word "comprising" strike out the comma; column 9, line 11, claim 10, after the word "unit" insert a comma; line 26, claim 11, for "resiliency" read *resiliently*; and that the said Letters Patent should be read with these corrections therein that the same may conform to the record of the case in the Patent Office.

Signed and sealed this 23rd day of March, A. D. 1948.

[SEAL]

THOMAS F. MURPHY,
*Assistant Commissioner of Patents.*